(12) United States Patent  
Caffrey

(10) Patent No.: US 9,511,276 B2  
(45) Date of Patent: Dec. 6, 2016

(54) GAMING SYSTEM USING GAMING SURFACE HAVING COMPUTER READABLE INDICIA AND METHOD OF USING SAME

(71) Applicant: Michael S. Caffrey, Tucson, AZ (US)

(72) Inventor: Michael S. Caffrey, Tucson, AZ (US)

( * ) Notice: Subject to any disclaimer, the term of this patent is extended or adjusted under 35 U.S.C. 154(b) by 684 days.

(21) Appl. No.: 13/691,662

(22) Filed: Nov. 30, 2012

(65) Prior Publication Data

US 2014/0151960 A1    Jun. 5, 2014

(51) Int. Cl.
| | | |
|---|---|---|
| A63F 3/00 | (2006.01) | |
| A63F 13/213 | (2014.01) | |
| A63F 13/92 | (2014.01) | |
| A63F 9/24 | (2006.01) | |

(52) U.S. Cl.
CPC .......... *A63F 3/00643* (2013.01); *A63F 13/213* (2014.09); *A63F 13/92* (2014.09); *A63F 3/00* (2013.01); *A63F 2003/00482* (2013.01); *A63F 2009/241* (2013.01); *A63F 2009/242* (2013.01); *A63F 2009/246* (2013.01); *A63F 2009/2419* (2013.01); *A63F 2300/1093* (2013.01); *A63F 2300/6045* (2013.01)

(58) Field of Classification Search
CPC ............... A63F 3/00643; A63F 2300/6045; A63F 2003/00482; A63F 2009/242; A63F 3/00006; A63F 3/00694; A63F 2003/0047
See application file for complete search history.

(56) References Cited

U.S. PATENT DOCUMENTS

| | | | |
|---|---|---|---|
| 4,580,787 A | | 4/1986 | Baker |
| 4,992,650 A | | 2/1991 | Somerville |
| 5,324,040 A | * | 6/1994 | Panda .................... A63F 3/0423 273/258 |
| 6,070,871 A | | 6/2000 | Wilson et al. |
| 6,108,612 A | | 8/2000 | Vescovi et al. |
| 6,151,564 A | | 11/2000 | Vescovi et al. |
| 6,167,353 A | * | 12/2000 | Piernot ................. G06F 3/0425 150/152 |
| 6,340,119 B2 | | 1/2002 | He et al. |
| 7,394,459 B2 | | 7/2008 | Bathiche et al. |
| 7,397,464 B1 | | 7/2008 | Robbins et al. |
| 7,749,060 B1 | | 7/2010 | Olmes, III et al. |
| 2005/0258597 A1 | * | 11/2005 | Soltys et al. .................. 273/274 |
| 2009/0184467 A1 | * | 7/2009 | Henderson ................ 273/153 S |
| 2009/0264200 A1 | * | 10/2009 | Schwartz ........................ 463/40 |
| 2010/0004062 A1 | * | 1/2010 | Maharbiz et al. .............. 463/36 |
| 2011/0053688 A1 | * | 3/2011 | Crawford et al. .............. 463/31 |
| 2011/0300516 A1 | * | 12/2011 | Wigdor ................ G09B 21/007 434/116 |
| 2013/0085585 A1 | * | 4/2013 | Griffen .......................... 700/91 |

* cited by examiner

*Primary Examiner* — James S McClellan  
*Assistant Examiner* — Syvila Weatherford  
(74) *Attorney, Agent, or Firm* — Michael J. Curley; Quarles & Brady LLP

(57) ABSTRACT

A gaming system is provided having a plurality of playing positions, with each playing position having both a human readable and a machine readable indicia identifying the playing position. The gaming system also includes playing pieces, which also have both human and machine readable indicia. The gaming system uses a smart phone with an optical scanner to facilitate interaction with the gaming surface and pieces.

5 Claims, 15 Drawing Sheets

GAMING SYSTEM USING GAMING SURFACE HAVING COMPUTER READABLE INDICIA AND METHOD OF USING SAME

FIELD OF THE INVENTION

The invention relates to board games, and in particular, to board games using electronic means to facilitate game play.

BACKGROUND OF THE INVENTION

Board games have been a popular social activity for centuries. Board games are attractive, in part, because they provide a rich play experience, offering the players a visually complex, 3-d experience, with which the players physically interact. Also, board games provide players with a wide range of decisions to be made and variables to be considered before a player makes a decision or a move. Additionally, board games have an attractive social aspect, enabling a group of players to have face-to-face interactions, conversations, etc., while game play is ongoing.

Over the last 30 years, electronic video games have presented a challenge to the continuing popularity of board games. Video games are attractive and popular, in part, because video games streamline and simplify game play. Instead of having to memorize a complex set of rules (or consult a rule book during game play) a video gamer simply performs some action in the electronic gaming environment (e.g., move there, manipulate that object, shoot that monster, etc.) In video games, the complex tracking and adjustment of the state of the player's piece, avatar, etc., with respect to other those of other players, or other elements of the game, is handled by the computer.

It would be advantageous to have a system that incorporates the best aspects of both video game play and board games.

SUMMARY OF THE INVENTION

The invention relates generally to game play surface or board, which incorporates both human and machine readable indicia. In certain embodiments, the game play surface is used in conjunction with playing pieces, which also have both human and machine readable indicia. A programmable processor in conjunction with an optical scanning device, storage, and input-and-output devices is used to scan the machine readable indicia on the game play surface and/or the playing pieces to facilitate game play.

In certain embodiments a gaming surface is provided. The gaming surface has a plurality of cells acting as playing positions, where each cell includes a first unique indicia and a second unique indicia, and the first unique indicia is human readable and the second unique indicia is machine readable. In some embodiments, the first and second unique indicia correspond to a position of a cell. In certain embodiments, the cells are contiguous within the gaming surface, and are arranged in rows and columns, with the first unique indicia being writing indicating a row and column address of the cell.

In some embodiments, the second unique indicia is a machine readable barcode. In certain embodiments, the machine readable barcode is a linear or matrix barcode, a QR code, or the like. Some embodiments include a gaming surface having polygonal cells, being defined by a plurality of edges forming a perimeter around each cell, with at least one edge of a cell having a third indicia. The third indicia can include a color and for a given cell, the third of indicia of each edge can be a unique color.

Some embodiments include a gaming system. The gaming system has a plurality of game pieces, each game piece including a machine readable piece indicia encoding a unique identifier for the game piece, and a human-readable indicia identifying the piece. The system also includes a gaming surface having a plurality of cells adapted to be occupied by a game piece. At least some of the plurality of cells include a unique human-readable indicia identifying the cell, and a unique machine readable indicia identifying the cell. The system also has an optical scanner configured to read the machine readable piece indicia and the machine readable cell indicia, and a processor in communication with the optical scanner configured to facilitate game play, at least, by decoding the machine readable cell indicia to generate data regarding the identity of the cell and decoding the machine readable piece indicia to generate data regarding the identify of the game piece. The system also has storage in communication with the processor, a visual display in communication with the processor, and an input device in communication with the processor.

In certain embodiments, some of the plurality of cells include a plurality of perimeter indicia arranged around the perimeter of the cell. In some embodiments, the storage includes information defining at least one attribute for at least some cells and at least one attribute for each of the game pieces. In another embodiment, the at least one attribute for at least some cells includes a cell position. In another embodiment the at least one attribute for each of the game pieces includes a game piece position.

In some embodiments, the gaming system has a processor that facilitates game play interaction between a first game piece and a second game piece, by causing the display to display information notifying a first player to take some action, receiving data related to a scan of machine readable piece indicia related to the second game piece from the optical scanner, changing an attribute associated with the first game piece in storage, and changing an attribute associated with the second game piece in storage.

In certain embodiments, the storage has a beginning of turn state associated with each of the plurality of game pieces. In another embodiment, the beginning of turn state includes a beginning of turn position associated with each of the plurality of game pieces, a beginning of turn facing direction associated with each of the plurality of game pieces, and a movement allowance associated with each of the plurality of game pieces.

In yet another embodiment, the gaming system has processor that is further configured to facilitate game play between a game piece of a first player and a cell by causing the display to display information notifying a first player to take some action; retrieving the beginning of turn position and facing direction associated with a game piece of the first player from storage, receiving data related to a scan of machine readable cell indicia from the optical scanner, identifying the cell corresponding to the scanned machine readable cell indicia, retrieving the location of the cell corresponding to the scanned machine readable cell indicia, and comparing the location of the cell corresponding to the scanned machine readable cell indicia to the beginning of turn position associated with the game piece of the first player.

In another embodiment, the gaming system has a processor that is further configured to, if the location of the cell corresponding to the scanned machine readable cell indicia is different from the beginning of turn position associated with the game piece of the first player, calculate a movement path across the gaming surface from the beginning of turn position of the game piece of the first player toward the location of the cell corresponding to the scanned machine readable cell indicia, select an end of turn cell on the playing surface representing an end of turn position of the game piece of the first player, select an end of turn facing direction for the game piece of the first player, and display data on visual display directing the first player to move the game piece of the first player to the selected end of turn cell.

In another embodiment, the gaming system selects an end of turn cell on the playing surface representing an end of turn position of the game piece of the first player, and selecting an end of turn facing direction for the game piece of the first player is done by the processor on the basis of the calculated movement path, the beginning of turn position associated with the game piece of the first player, the beginning of turn facing direction associated with the game piece of the first player, a movement allowance associated with the game piece of the first player, and additional attributes associated with cells along the movement path.

In another embodiment, the gaming system has a processor that is further configured so that after the processor has selected an end of turn cell on the playing surface representing an end of turn position of the game piece of the first player, the game piece of the first player has not exhausted its movement allowance, display to the first player a representation of the end of turn cell and prompt the first player to select an end of turn facing position for the game piece.

In yet another embodiment, the processor is further configured to facilitate game play by, if the location of the cell corresponding to the scanned machine readable cell indicia is the same as the beginning of turn position associated with the game piece of the first player, prompting the first payer to take some action changing a state of the game piece of the first player with respect to the cell corresponding to the scanned machine readable cell indicia. In some embodiments, changing a state of a game piece of the first player with respect to the cell includes displaying to the first player a representation of the cell corresponding to the scanned machine readable cell indicia, receiving from the first player input indicating a new facing direction for the game piece, selecting an end of turn facing position for the game piece on the basis of the first player's input and the movement allowance, and displaying to the first player directions to change the facing direction for the game piece of the first player.

In yet another embodiment, the gaming system has a visual display, the input device is provided by a touch-sensitive display, the system displays an image of the cell including a plurality perimeter indicia arranged around the perimeter of the cell, with each perimeter indicia representing a permissible game piece facing direction, and the system receives from the first player input indicating a new facing direction for the game piece of the first player by receiving from the touch-sensitive display input resulting from the first player touching one of the perimeter indicia.

In certain embodiments, the gaming system has a processor that is further configured to facilitate game play by, causing the display to display information notifying a first player to take some action, retrieving the beginning of turn state associated with the game piece of the first player and receiving data related to a scan of machine readable indicia encoding a unique identifier for the game piece of the first player. In yet another embodiment, the gaming system has a processor that is further configured to display to the first player data related to the beginning of turn state associated with the game piece of the first player. In another embodiment, the gaming system has a processor that is further configured to prompt the first player for input regarding a desired change of state for the game piece of the first player; receive input from the first player regarding a change of state for the game piece of the first player; and store data regarding an end of turn state associated with the game piece of the first player.

Further embodiments of the invention include an electronic device, such as a smart phone, that is configured to provide the processing, storage, optical scanning, and input/out functions of the systems described above.

In another embodiment, the method of game play is provided. The method of game play uses a plurality of game pieces, each game piece including a machine readable piece indicia encoding a unique identifier for the playing piece, and a gaming surface having a plurality of cells adapted to be occupied by a playing piece, wherein at least some of the plurality of cells include a unique human readable indicia identifying the cell, and a unique machine readable cell indicia identifying the cell, the method provides scanning a machine readable cell indicia with an optical scanner in communication with a processor; reading information from an information display in communication with the processor; and moving a game piece in accordance with the read information.

Embodiments of the invention have certain advantages. For example, by providing a game board and pieces having both a computer-readable and a machine readable indicia, the advantages of board game play are preserved while leveraging a computer to streamline game play. Players can interact with each other and with the visually rich, 3-d game board, while the computer (for example, a smart phone), handles the game state and dice rolls, and guides the players through the game. In this way, the board gaming experience is improved.

BRIEF DESCRIPTION OF THE DRAWINGS

FIG. 4b is an exemplary display screen showing an initial position and heading for a game piece being used according to the method of FIG. 4a.

FIG. 5b is an exemplary display screen showing an end-of-turn status for a game piece that has completed a move according to the method of FIG. 5a.

FIG. 6b is an exemplary display screen facilitating a change of facing direction for a game piece interacting with its own cell according to the embodiment of FIG. 6a.

FIGS. 7b-7d are exemplary display screens showing how an attack is played according to the method of FIG. 7a.

FIG. 8b is an exemplary display screen showing a game piece status returned according the method of FIG. 8a.

DETAILED DESCRIPTION OF THE PREFERRED EMBODIMENTS

The invention is described in preferred embodiments in the following description with reference to the FIGS., in which like numbers represent the same or similar elements. Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," "in certain embodiments," and similar language throughout this specification may, but do not necessarily, all refer to the same embodiment. It is noted that, as used in this description, the singular forms "a," "an" and "the" include plural referents unless the context clearly dictates otherwise.

The described features, structures, or characteristics of the invention(s) may be combined in any suitable manner in one or more embodiments. In the following description, numerous specific details are recited to provide a thorough understanding of embodiments of the invention(s). One skilled in the relevant art will recognize, however, that the invention(s) may be practiced without one or more of the specific details, or with other methods, components, materials, and so forth. In other instances, well-known structures, materials, or operations are not shown or described in detail to avoid obscuring aspects of the invention.

Figure 1:
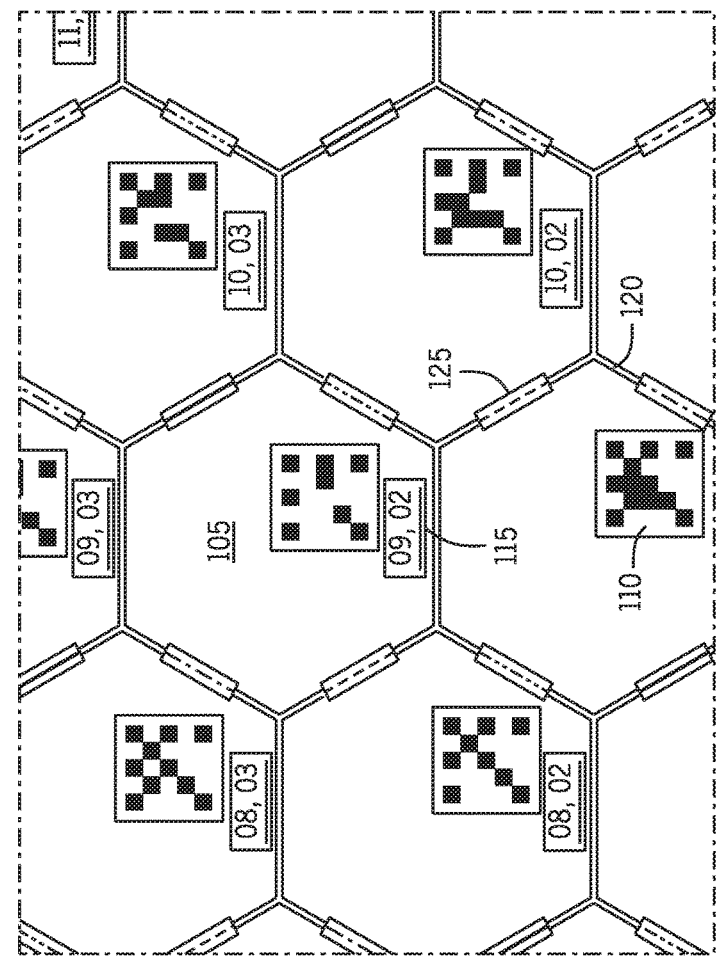
FIG. 1 is an elevated view of a gaming surface according to an embodiment of the invention.

FIG. 1 shows a gaming surface according to an embodiment of the invention. The gaming surface of FIG. 1 includes a plurality of cells 105, which may be occupied by a playing piece. Each cell 105 has a unique machine readable indicia 110 and a unique human readable indicia 115, with each of the indicia sufficiently and unambiguously identifying the cell. In the embodiment of FIG. 1, cells 105 are arranged in a two dimensional grid of rows and columns, with each of the human readable indicia 115 and the machine readable indicia 110 indicating the row and column address of the cell, however, these are not requirements. Any arrangement of cells is acceptable and within the scope of the invention, for example, cells may be arranged in any other 2-D arrangement apart from in columns and rows (e.g., the cells may correspond to randomly shaped regions on a map), cells may arranged linearly, along a path, and cells may even be arranged in three dimensions in a three dimensional gaming space having elevation.

Additionally, while the indicia of the arrangement of FIG. 1 indicate the row and column address of a cell, where the cells are laid-out in a grid, this is not a requirement. In the example of a path-type game, the unique human readable indicia might be "Baltic Avenue", "Board Walk", etc. If the gaming surface is a map, the human readable indicia might be "Kamchatka" or "Cemetery Ridge". The machine readable indicia may be any machine readable symbology that encodes the same or equivalent information as that conveyed by the human readable indicia.

In certain embodiments, machine readable indicia encode the same information conveyed by the human readable indicia. This can be done directly by using a QR code or other matrix or 2-D bar code that encodes a string of numbers according to a standard, which when decoded correspond directly to the row and column address of the cell. Alternatively, machine readable indicia according to the invention can encode a unique index value for the cell (e.g., "the $103^{th}$ cell"), which is then cross-referenced in a lookup table or a data structure containing additional information about the cell, such as its row and column address, or other cell attributes. Exemplary cell attributes vary depending on the details of the game, but may include things such as terrain attributes (i.e., the cell is a swamp or a road, which may have different associated movement penalties for pieces moving through the cell), the cell is at a high or low elevation, which may impact the ability of a unit in the cell to see or attack surrounding units, the cell contains a trap, which may damage a piece moving through the cell, the cell is on fire, which increases the heat associated with a piece moving through the cell, etc. In the example of FIG. 1, machine readable indicia 110 encode a 5 digit string corresponding to a unique index of the cell.

In the gaming surface of FIG. 1, cells (e.g., cell 105) are polygonal (i.e., hexagonal) and contiguous, and the gaming surface is comprised of a two dimensional grid of contiguous hexagonal cells. These are not requirements. Any shape and distribution of cells is acceptable and within the scope of the invention, so long as some may be identified by human readable and machine readable indicia 110, 115. For example, cells may be square, circular, rectilinear, or randomly shaped in the case of gaming surface representing a geopolitical map. In the example of FIG. 1, hexagonal cells 105 are defined by a plurality of linear edges 120, forming a perimeter around the cell. In the case of FIG. 1, each cell is bounded and defined by a perimeter of six line segments forming edges 120. Because the cells of FIG. 1 are contiguous, an interior cell's perimeter is shared with neighboring cells. Each edge 120 of each cell includes a third or perimeter indica 125. In the example of FIG. 1, perimeter indicia 125 is a color, and, for that cell, each edge has a unique color. For example, for cell 105, the upper or "northern" edge has a dark blue indicia, the southern edge has a red indicia, the northwestern edge has a green indicia, the southwestern edge has a magenta indicia, the northeastern edge has a teal indicia and southeastern edge has an orange indicia. Because edges are shared between adjacent cells, neighboring cells will have different colors corresponding to different directions for that cell. For example, while cell 105 (address: 09, 02) has an orange indicia on its southeastern edge, neighboring cell (address: 10,02) has an orange indicia on its northwestern edge, which it shares with cell 105. In the embodiment of FIG. 1, perimeter indicia 125 are used to signal the facing direction of a game piece occupying the cell.

Figure 2:
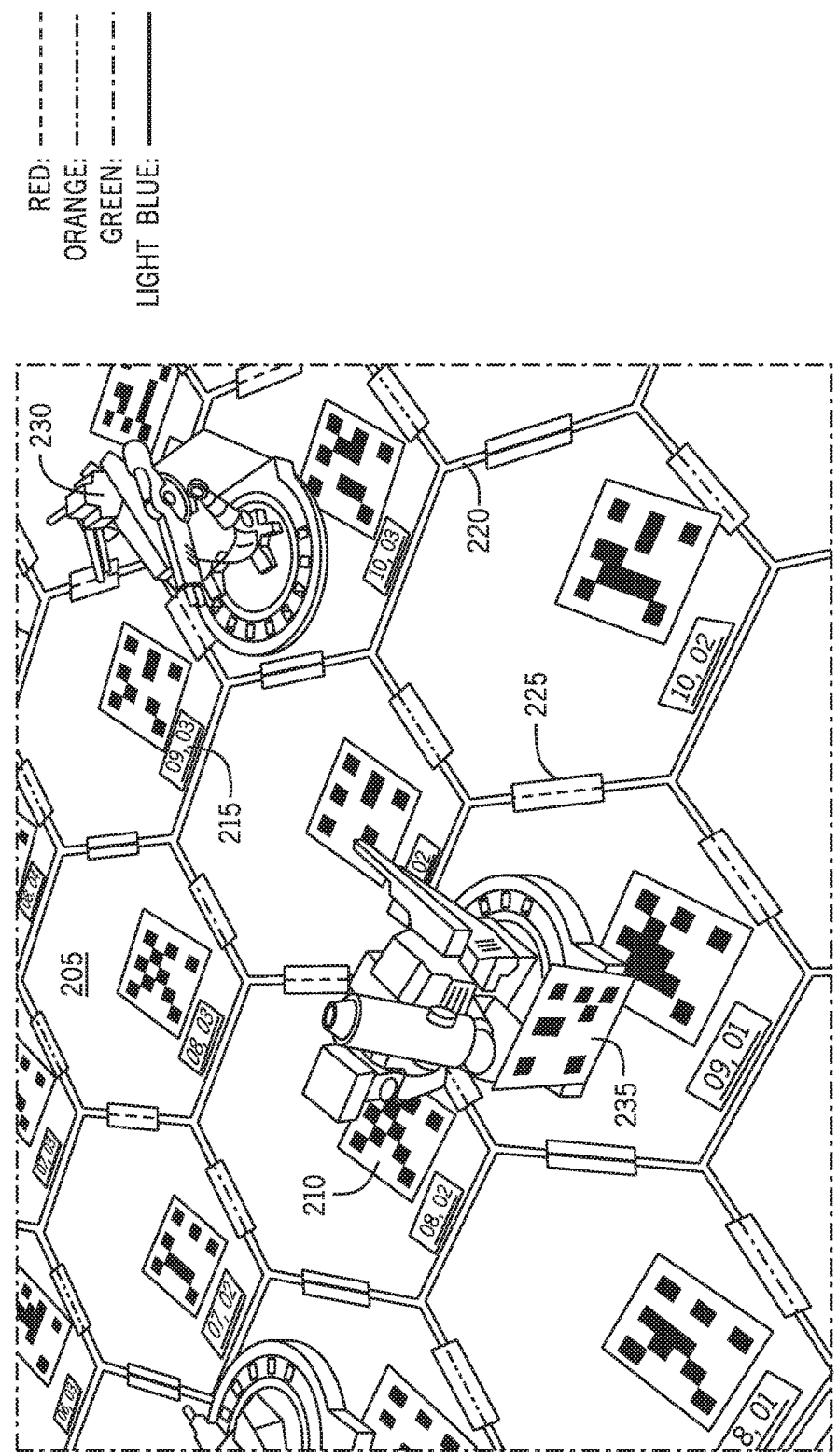
FIG. 2 is an elevated view of a gaming surface according to an embodiment of the invention including a plurality of gaming pieces.

FIG. 2 is an elevated view of a gaming surface according to an embodiment of the invention including a plurality of gaming pieces. As in the embodiment of FIG. 1, the gaming surface of FIG. 2 includes a plurality of contiguously arranged hexagonal cells (e.g., 205), each of which includes a machine readable indicia 210 and a human readable indicia 215 sufficient to uniquely identify the cell. Each cell defined by a perimeter, itself defined by a plurality of edges 220, where each edge has perimeter indicia 225. The perimeter indicia 225 uniquely identify each edge 220 of each cell, i.e., each cell has as many perimeter indicia as it has edges. Like in the embodiment of FIG. 1, perimeter indicia 225 comprise a color, with each cell having 6 colors uniquely identifying each edge of that particular cell.

The surface of FIG. 2 includes a plurality of game pieces 230. In certain embodiments, each player has an associated single game piece 230. Each game piece includes a machine readable piece indicia 235, which encodes machine readable information sufficient to uniquely identify the game piece. Each game piece optionally includes a human readable indicia identifying the piece. In the example of FIG. 2, machine readable piece indicia 235, like machine readable cell indicia 210, is a QR code or other matrix or 2-D bar code. In certain embodiments, machine readable piece indicia 235 encodes a string of letters according to a standard, the string of letters corresponding to the identity of the game piece (e.g., "Rob Gronkowski" or "Thanatos"). Alternatively, and preferably, machine readable piece indicia 235 encodes a unique numerical index value for the piece (e.g., "the 4th playing piece"), which is then cross-referenced in a lookup table or other data structure, which includes additional information about the piece, such as its current row and column address, the direction the piece is facing, and other attributes such as: the identity of the player controlling the piece, the piece's movement allowance, damage sustained by the piece, damage the piece is capable of inflicting, etc. In the example of FIG. 2, machine readable piece indicia 235 encodes a 5 digit string corresponding to a unique index for the piece.

In certain embodiments, gaming arrangements according to the invention include additional pieces, which also include human and machine readable incidia. These pieces can be used to illustrate attributes of cells that a game designer wishes to be visible on the game board. For example, in certain embodiments, hexagonal tiles are provided with machine and human readable indicia disposed thereon identifying the tiles, which tiles can illustrate transitory effects caused by players or the game play process that affect certain cells. Examples include "runway damage", "bridge down", "fire", "oil slick", etc.

Additionally, while in the example of FIG. 2, and elsewhere in the specification, game pieces according to the invention are describe as belonging to players, this is not a requirement. Games according to the invention may have other objects, that are moveable across the game board, which also carry both machine and human readable indicia. Examples of such pieces include non-player characters, monsters, etc., whose turn-by-turn game state (including position) is automatically determined by a programmable processor, such as is described below with respect to FIG. 3. In other embodiments according to the invention, inanimate pieces are provided and marked with human and machine readable indicia, which pieces can occupy playing positions, i.e., cells. An example of such a piece would be a section of castle wall, or a gate, which could take damage until destroyed, the state of which can be tracked by the programmable processor operating in conjunction with storage as described below.

Figure 3:
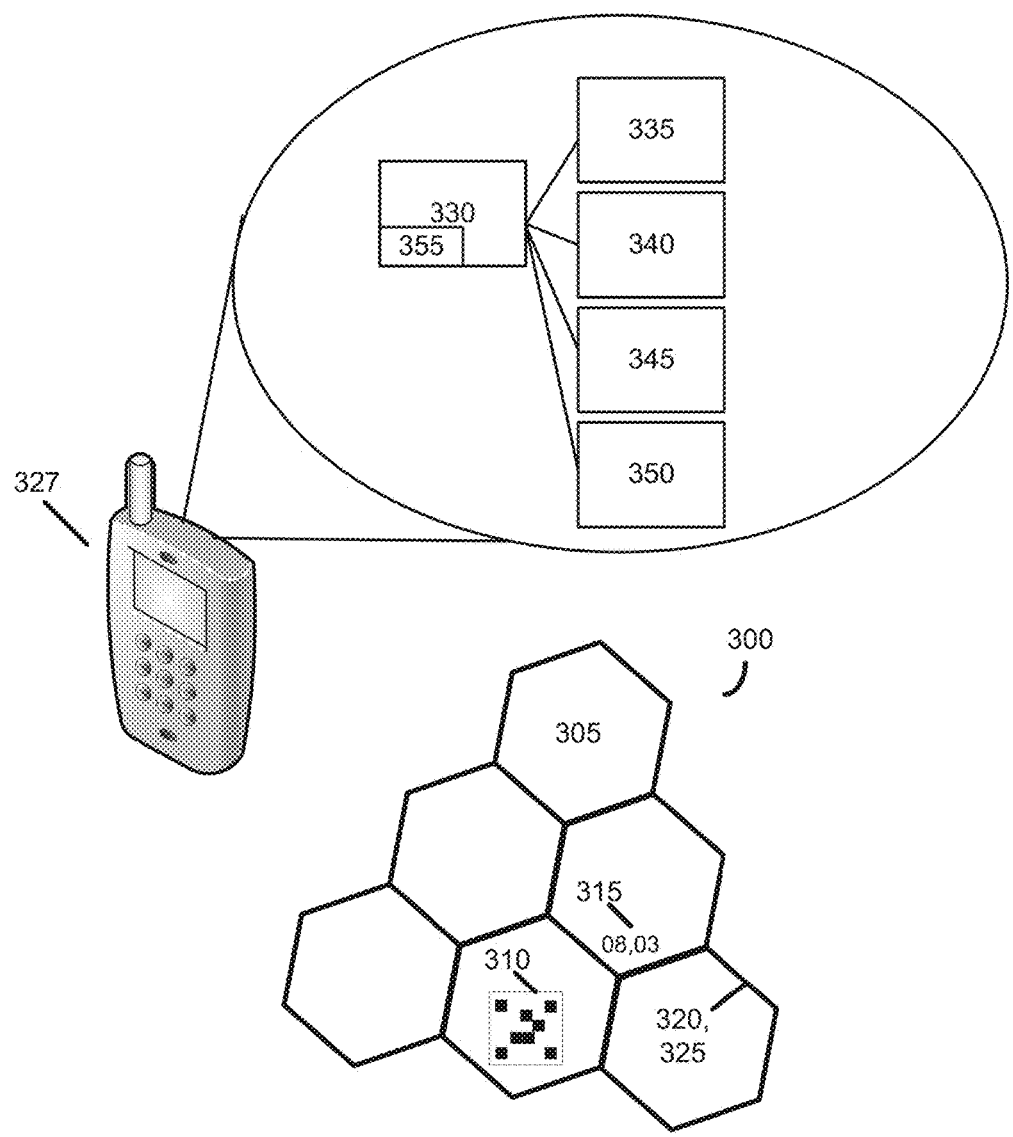
FIG. 3 is a schematic diagram of a gaming system according to an embodiment of the invention.

FIG. 3 is a schematic diagram of a gaming system according to an embodiment of the invention. The system of FIG. 3 includes a game play surface with game pieces as is set forth above with respect to FIG. 2. The system includes a gaming surface 300 (only a portion of which is illustrated for clarity) having a plurality of contiguous hexagonal cells 305. As in the embodiments set forth above, each cell 305 includes human readable 315 and machine readable indicia 310 uniquely identifying the cell. Each cell is defined by a plurality of edges 320, forming a perimeter around the cell, and each cell includes a third indicia 325, which uniquely defines an edge of a cell, for that particular cell. The system of FIG. 3 also includes game piece including human and machine readable indicia, as in FIG. 2, but these have been omitted for clarity.

The system of FIG. 3 includes a programmable computer processor 330, which may be provided by any general or special purpose computer, personal digital assistant (PDA), tablet or smart phone. Processor 330 executes a random or pseudorandom number generation function 355 to facilitate game play (i.e., to replicate the rolling of dice in a conventional board game).

The system of FIG. 3 includes non-volatile storage 335 in electronic communication with processor 330. Non-volatile storage 335 includes a variety of data related to the state of game play. Exemplary types of data included in non-volatile storage 335 include: one or more lookup tables that cross-reference the data encoded by the machine readable cell indicia to the identities of the corresponding cells; one or more lookup tables that cross-reference the data encoded by the machine readable game piece indicia to the identities of the corresponding game pieces; data structures associated with each cell, where each data structure may include a plurality of variables corresponding to cell attributes, such as, the identity of the cell, the cell's position (i.e., the row and column address), whether the cell is occupied by a game piece, an occupying game piece's identity, state, attributes, and facing direction, and other attributes such as movement penalties associated with the cell (e.g., the cell is swamp, movement through the cell is reduced by 50%), damage effects associated with the cell (e.g., a minefield has been laid in the cell, all pieces moving through the cell have a 30% chance of suffering damage); the elevation of the cell, or any other attributes that impact game play (e.g., the cell is adjacent to one occupied by a Pro Bowl corner back, the chances of completing a pass to a friendly piece in the cell are reduced by 70%). Non-volatile storage 335 may also include one or more data structures corresponding to game pieces, where each data structure includes one or more variables corresponding to game piece attributes, including: the identity of the game piece; the identity of the player controlling the game piece; the game piece's position and facing direction; the game piece's movement allowance; the game piece's damage allowance; the game piece's elevation due to its position on the board; the types of weapons the game piece has, their ranges, and the amount of ammunition they currently have, or any other attribute of the game piece (e.g., piece number 4 is capable of doing 5-50 points of damage; game piece number 4 is at 80% heat capacity, game piece number 4 has a twisted ankle and its movement is reduced by 30%, etc.)

The states or values of at least some of the variables of the data structures included in non-volatile storage 335 are time varying, and are updated by programmable processor 330 as game play progresses. Non-volatile storage 335 includes at least a beginning of turn state, in which all relevant variables are defined with a first, beginning of turn state, and a second, end of turn state. Non-volatile storage 335 may also include machine executable instructions to be executed by processor 330 to facilitate game play according to the methods discussed more fully below. In particular, non-volatile storage 335 may include a rule set. In certain embodiments, the rule set is applied by processor 330 to inputs received from the data structures associated with the cells and game pieces, a random or pseudorandom number generation function 355, and game players through the input output device discussed more fully below.

In the system of FIG. 3, processor 330 is in electronic communication with optical scanner 340, and associated interface electronics and software. Optical scanner 340 is configured to decode machine readable indicia (e.g., machine readable cell indicia 310 and piece indicia 235). In certain embodiments, optical scanner 340 is a laser barcode scanner. In a preferred embodiment, optical scanner is a digital camera with associated QR or 2-D matrix bar code recognition software. In methods of game play according to the invention, players "move" by scanning, with optical scanner 340, the machine readable indicia associated with their own pieces, the pieces of other players, cells on the gaming surface, or other objects carrying machine readable indicia that are present on the board.

In the system of FIG. 3, processor 330 is in electronic communication with input-output ("I/O") device 345. I/O device 345 may be realized by more than one device. In certain embodiments I/O device 345 is realized by a keyboard and an electronic visual display, for example, where system elements 330-350 are implemented on a desktop personal computer. In other embodiments, I/O device 345 is realized by an electronic visual display and a stylus, for example, where system elements 330-350 are implemented on a tablet that uses a stylus for input. In preferred embodiments, I/O device is a touch-sensitive display, such as is typically found on a "smart" cellular telephone. In systems according the invention I/O device 345 displays (upon instructions from processor 330) information to game players, for example, by indicating to the players the identity of the player whose turn it is to move, by displaying the human readable indicia of the cell to which a player is to move the player's piece, and the end of turn facing position for that piece, by displaying information about a cell with which a player has chosen to interact, or by displaying information about another game piece with which a player has chosen to interact. Exemplary display screens presented by I/O device 345 in certain embodiments of the invention are described below in reference to FIGS. 4b, 5b, 6b, 7b-d and 8b. Additionally, I/O device 345 takes game player input from players to facilitate game play. For example, processor 330 may receive as input through I/O device information about how a player wishes to interact with another player's piece or a selected cell, for example "attack the displayed piece with autocannon", "heal the displayed piece", or "dismount infantry in that cell". In embodiments where I/O device 345 is a touch sensitive display, I/O device receives input by displaying a plurality of labeled touch sensitive regions, each corresponding to an available game play action.

In the system of FIG. 3, processor 330 is in electronic communication with network transceiver 350. In certain embodiments network transceiver 350 is a wireless network transceiver in communication with an external network, such as the internet. Processor 330 can receive data through network transceiver 350, which data is used to update the data structures storing date regarding the state of game play present in non-volatile storage 335. For example, in certain embodiments, a game player may purchase upgrades applicable to the player's game piece, and data regarding such upgrades can be loaded into non-volatile storage 335, where it is available for game play.

In a preferred embodiment, processor 330, non-volatile storage 335, optical scanner 340, I/O device 345 and network transceiver 350 are implemented in a single device, such as a smart cellular telephone 327, which is passed from player to player during game play. In alternative embodiments, the functionality of elements 330-350 is implemented in a distributed fashion. For example, in certain embodiments, individual players play with their own cell phones, which provide individual processing functionality, I/O functionality, and optical scanning functionality, while some processing and data storage functions may be hosted on an external network, for example, the internet.

Exemplary operation of the gaming system of FIG. 3 is set forth below in reference to exemplary game play flowcharts provided in FIGS. 4a-8b. The game described below in reference to FIGS. 4a-8b is a turn-based, combat simulation game, where game pieces representing robots are maneuvered across a battlefield where they engage in combat. This example, however, should not be construed as limiting. The system of the invention can be applied to a limitless number of game scenarios, for example, role-playing games where players move character avatars through a dungeon, war games where players move units of soldiers across battlements, etc. Any gaming system in which a computer is used to direct interaction with a physical game board having both machine and human readable indicia should be deemed to be within the scope of the invention.

Figure 4A:
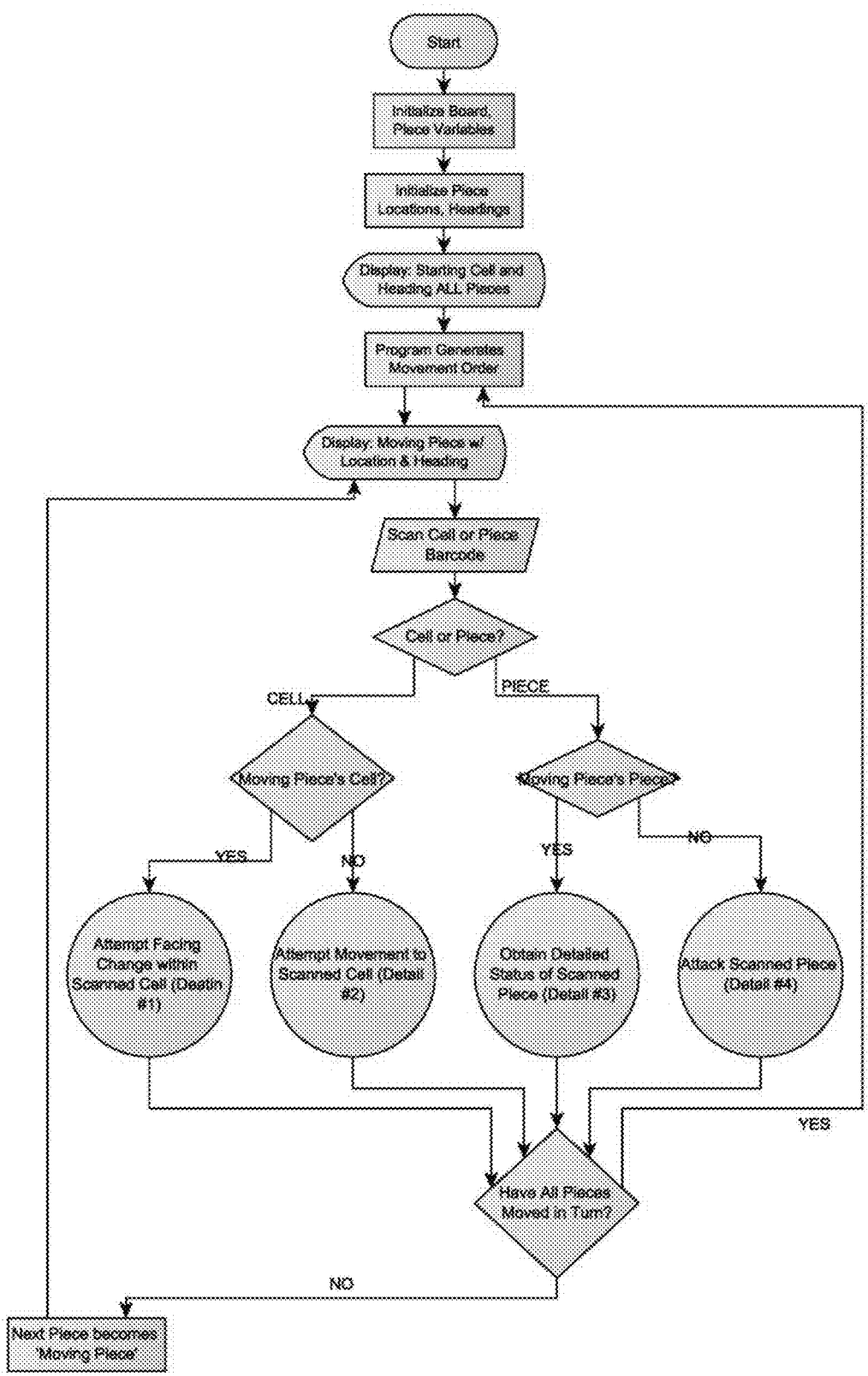
FIG. 4a is a flowchart showing a method of high-level game play according to an embodiment of the invention.

FIG. 4a is a flowchart showing a method of high-level game play according to an embodiment of the invention. According to the method of FIG. 4, a game is started through interaction with processor 330. Processor 330 generates or retrieves an initial game state, which includes an initial state for all cells on the board, and an initial state for all game pieces. The initial game state is loaded into storage 335. Additionally, the initial locations and facing directions of playing pieces is set and stored.

Figure 4B:
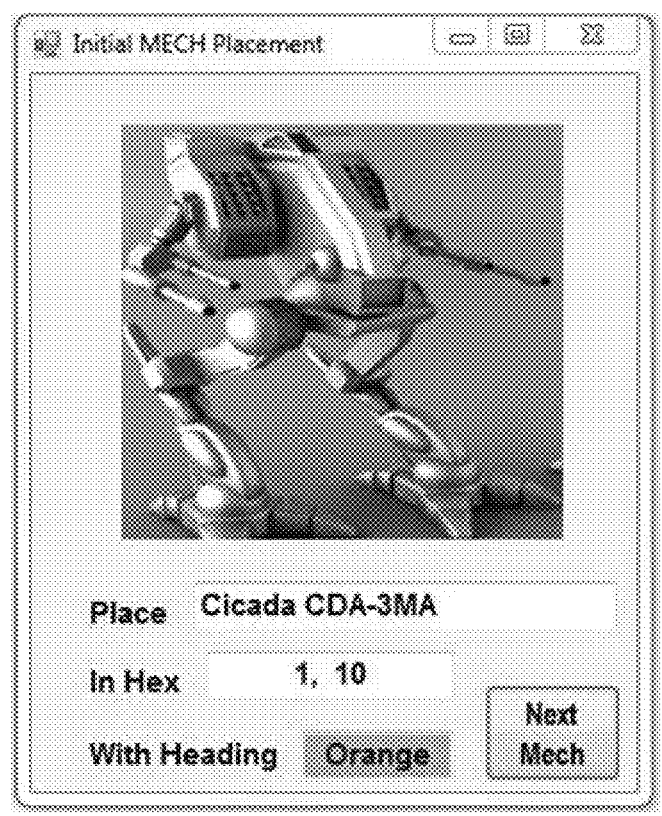

Once the initial game state has been defined and stored, information is displayed to game players that allows the board to be physically initialized, i.e., I/O device 345 displays instructions directing players to place their pieces on the board with their initial positions and with their initial facing directions. FIG. 4b shows an exemplary display providing instructions to a player regarding the initial placement of the player's piece. As can be seen in FIG. 4b, the system provides each player with a display showing a depiction of the player's piece, the identity of the piece ("Cicada"), the row and column address of the piece's initial position (1, 10), and the facing direction or heading (Orange). The initialization display also includes a button for advancing to the next player's piece.

Under the method of FIG. 4a, a movement order (i.e, the order in which turns are taken) is generated by processor 330. Any number of criteria for defining the movement order is acceptable. For example, random number generation function 355 may be used to generate a new, random movement order for each turn. Alternatively, the initial movement order may be generated, and then kept fixed between turns throughout the game. Alternatively, movement order may be determined by the end-of-game state of the game pieces for the previous turn, e.g., pieces with left-over movement allowance or the least damage from the previous turn move first, followed by pieces with the greatest movement allowance allocation for the next turn. As part of the determination of movement order, players may be given the opportunity to spend some sort of currency to determine or enhance a predetermined movement order, e.g., by spending "energy points" or the like.

Once the movement order has been determined, a player's turn begins with the I/O device 345 displaying the moving piece's location and heading (i.e., facing direction). In certain embodiments, this is accomplished by rendering on an electronic display a visual representation of the cell currently occupied by the moving piece, including the cell's machine readable, human readable and third (i.e., facing direction) indicia. The moving player then takes the player's turn by scanning one of the machine readable indicia on the game board, either on a cell, on a playing piece, or on some other object marked with machine readable indicia. In the example of FIG. 4a, a moving player has four options: scan the cell currently occupied by the player's piece, scan a distant cell, scan the player's own piece, scan another player's piece. Game play proceeds differently depending on which of these options is chosen. Under the rules exemplified by the method of FIG. 4a, if a player scans a cell other than the cell occupied by the player's piece, the player moves the game piece across the board toward the scanned cell. If a player scans the cell occupied by the player's piece, the player's piece changes its facing direction within that cell. If the player scans another game piece (e.g., another player's piece or an NPC or "non-player character" piece, or one of the inanimate objects occupying a cell described above), the player's piece interacts with that piece, e.g., to attack it. If the player scan's the players own piece, the player receives detailed information about the piece, and is given the option to end the player's turn early.

When a player has completed the player's move, the system, operating according to the embodiment of FIGS. 4a-8b, prompts the next player to take their turn. When all players have moved, the system generates a movement order for the following turn. The four options for a turn set forth above are discussed in further detail below.

Figure 5A:
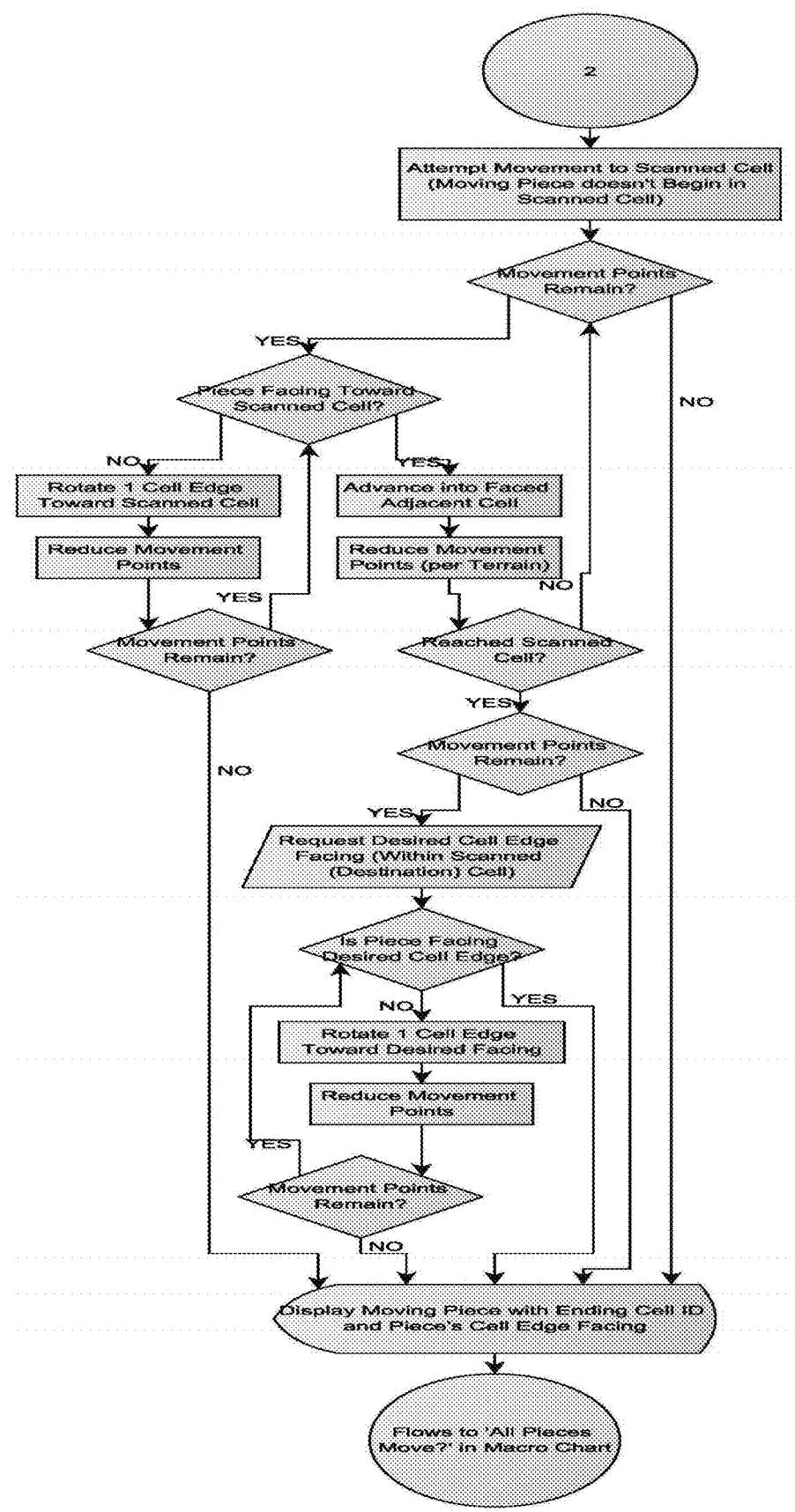
FIG. 5a is a flowchart showing a method of moving a game piece between cells, according to an embodiment of the invention.

FIG. 5a is a flowchart showing a method of moving a game piece between cells, according to an embodiment of the invention. As is set forth above with respect to FIG. 4a, the method of FIG. 5a is implemented when a moving player scans a cell not occupied by the player's own piece. When this occurs, the processor 330 consults storage 335 to determine whether the moving player's piece has a movement allowance (e.g., movement points). If the player's movement allowance is not yet exhausted, a move may occur. The first step for executing a move is determining whether the player's piece is facing toward the direction of the scanned cell, i.e., the cell toward which the player intends to move. If not, the processor 330 computes the necessary rotation of the piece toward the target cell, and a deduction is made from the player's movement allowance. Processor 330 then calculates a movement path toward the scanned cell. In one embodiment, this calculation is done according to the most efficient, near-straight line path between the player's piece and the scanned distant cell, i.e., the path that expends the fewest movement points. Once the movement path is calculated, the system directs the player through I/O device 345 to advance their piece to the scanned cell or the cell along the computed path where movement points were exhausted.

Depending on the player's movement allowance, the player will either be able to complete the move toward the scanned cell or the player will come up short. In either case, the system displays to the player an end-of-turn display screen. An exemplary end-of-turn display screen is pictured in FIG. 5b. As can be seen if FIG. 5b, the end of turn display screen provides the moving player with information sufficient to allow the player to know where and how to place the piece at the end of the turn. The end-of-turn display screen includes a depiction of the player's piece, an identification of the player's piece (e.g., "Enforcer"), the address of the end-of-turn position for the piece ("2, 5"), and an indication of the end of turn facing direction for the piece ("Red"). Optionally, the end-of-turn display screen also provides other status information about the moving player's piece, for example, the piece's remaining health or energy level. In certain embodiments, the end-of-turn display screen provides a button allowing the player to access more detailed information about the state of the piece, for example, whether all weapons are operational, the status of any cooldowns, etc.

When a piece lands in an end-of-turn cell with an exhausted movement allowance, the end-of-turn facing direction will be along the calculated movement path being taken by the piece during the course of the move. If the player reaches the scanned cell without having exhausted the players movement allowance, the player is presented with an option to change the facing direction of the piece. If the player chooses to change directions, the player picks a new facing direction by interacting with the I/O device, the processor deducts appropriate movement points, and the player is presented with a new end-of-turn representation of the end-of-turn cell showing the new orientation of the piece toward a representation of the perimeter (directional) indicia on the game board. The player then rotates the piece on the game board such that it is consistent with the displayed end-of-turn representation. An exemplary method for changing facing directions is set forth below in additional detail with respect to FIG. 6a.

In certain embodiments, if a player still has movement points at the end of move, the player may take another action before end-of-turn, such as by scanning another cell to make another move. A player may wish to do this exercise more control over the piece's movements, for example, to take a less efficient path across the board to avoid the range of an opponent's guns or some other hazards. Alternatively or additionally, a player may launch an attack on another player's piece at the end of a move, if movement points or some other currency has not been exhausted.

Figure 6A:
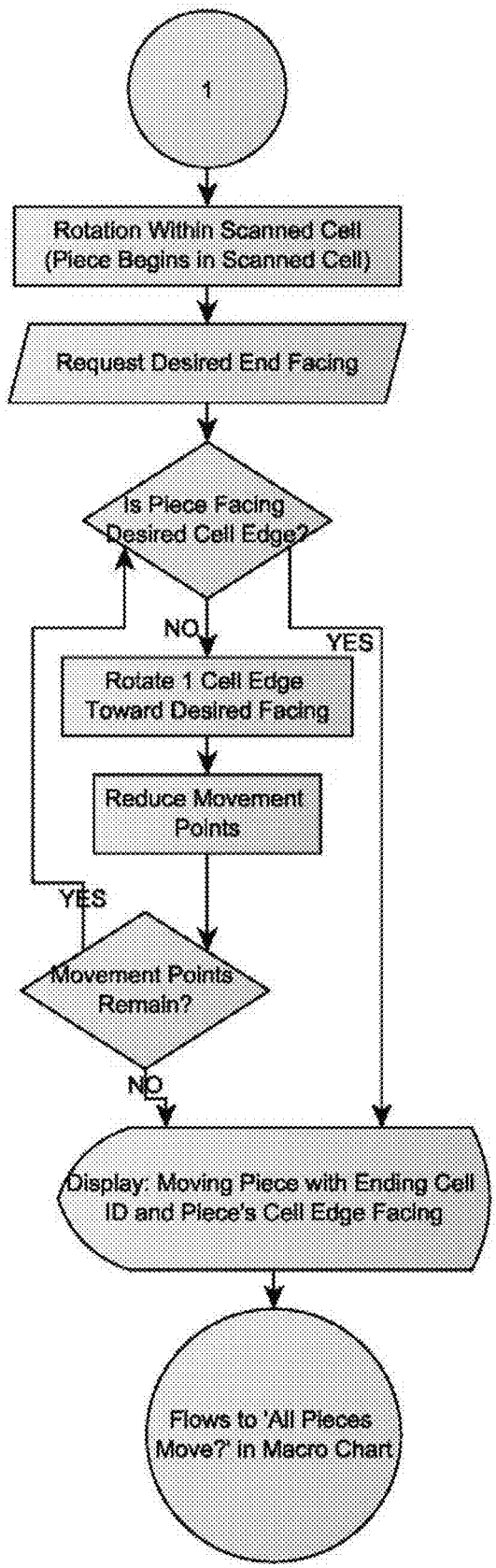
FIG. 6a is a flowchart showing a method of game play interaction between a game piece and the cell that game piece currently occupies, according to an embodiment of the invention.
Figure 6B:
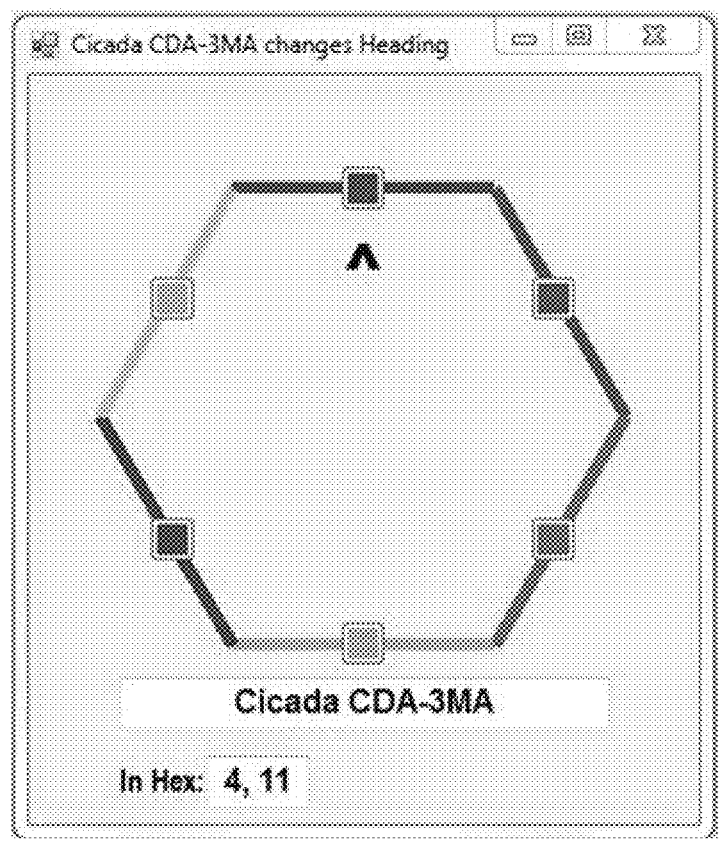

FIG. 6a is a flowchart showing a method of game play interaction between a game piece and the cell that game piece currently occupies, according to an embodiment of the invention. The method of FIG. 6 begins when a player scans the cell currently occupied by the player's piece. When this occurs, the player is shown a visual representation of the cell, including the current facing direction of the piece within the cell, and including a representation of edge indicia that corresponds to the edge indicia on the board. An exemplary display screen for a change of facing direction is shown at FIG. 6b. When viewing the screen of FIG. 6b, the player may select an desired new facing position by tapping on an active icon on one of the displayed cell edges. If the desired end of turn facing position is the same as the piece's current facing position, the player is shown the representation of the cell occupied by the piece with no change, and in certain embodiments, the player may be prompted to take additional action (i.e., move, interact with some other player, or end the turn). If the direction selected is different from the current facing direction, the system calculates the movement point deduction required to rotate the piece, calculates and end-of-turn facing position based on the difference between the player's movement allowance and the appropriate movement point deduction, displays an end-of-move representation of the cell showing the new facing direction, deducts the appropriate movement points, and updates the state of the piece in storage.

Figure 7A:
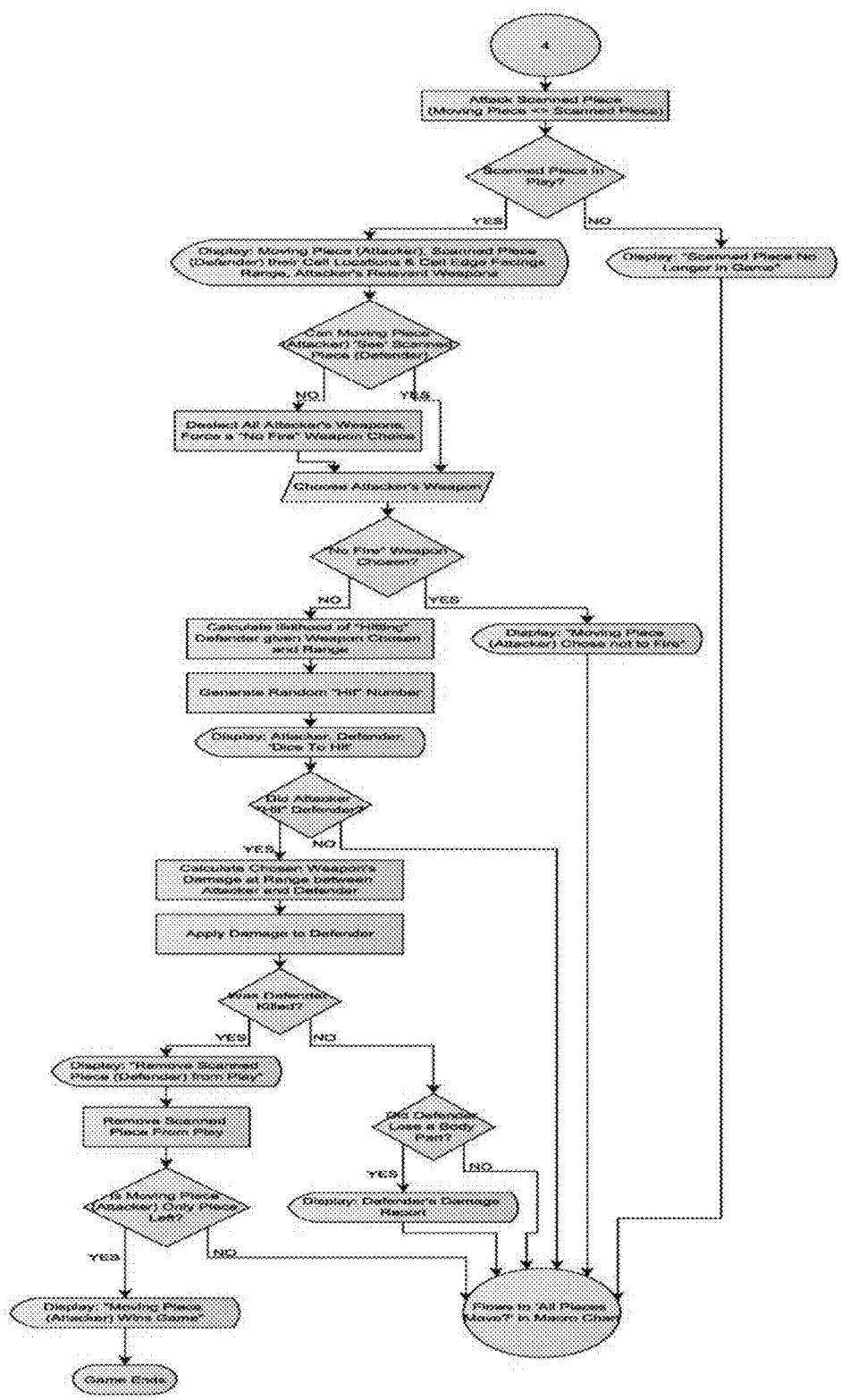
FIG. 7a is a flowchart showing a method of game play interaction between a game piece and another game piece according to an embodiment of the invention.

FIG. 7a is a flowchart showing a method of game play interaction between a game piece and another game piece according to an embodiment of the invention. The method of FIG. 7a is implemented when a player scans a piece that is not the player's own piece. When this occurs, the system first determines whether the scanned piece is "in play". For a variety of reasons, the scanned piece may not be eligible to be interacted with, for example, because it is in a bunker, or is invisible, or has already been destroyed. If the scanned piece is in play, the system calculates a variety of parameters relevant to interaction between the player's piece and the scanned piece, for example, the range between the pieces, both the absolute and relative facing directions of the players' piece, the relative height of the pieces, and the elevation of any intervening cells. These parameters are later used by the processor in determining the efficacy of an attack. Additionally, these parameters determine whether the scanned target piece can "see" a scanned piece, i.e., whether positional variables prevent an attack. In particular, if a target piece is not in a predefined field of view of an attacking piece (i.e., if the attacking piece is facing away from the target piece, or if there is some intervening piece of high elevation terrain between the pieces), an exemplary system of FIG. 7a will deny the attacking player the ability to attack.

Figure 7B:
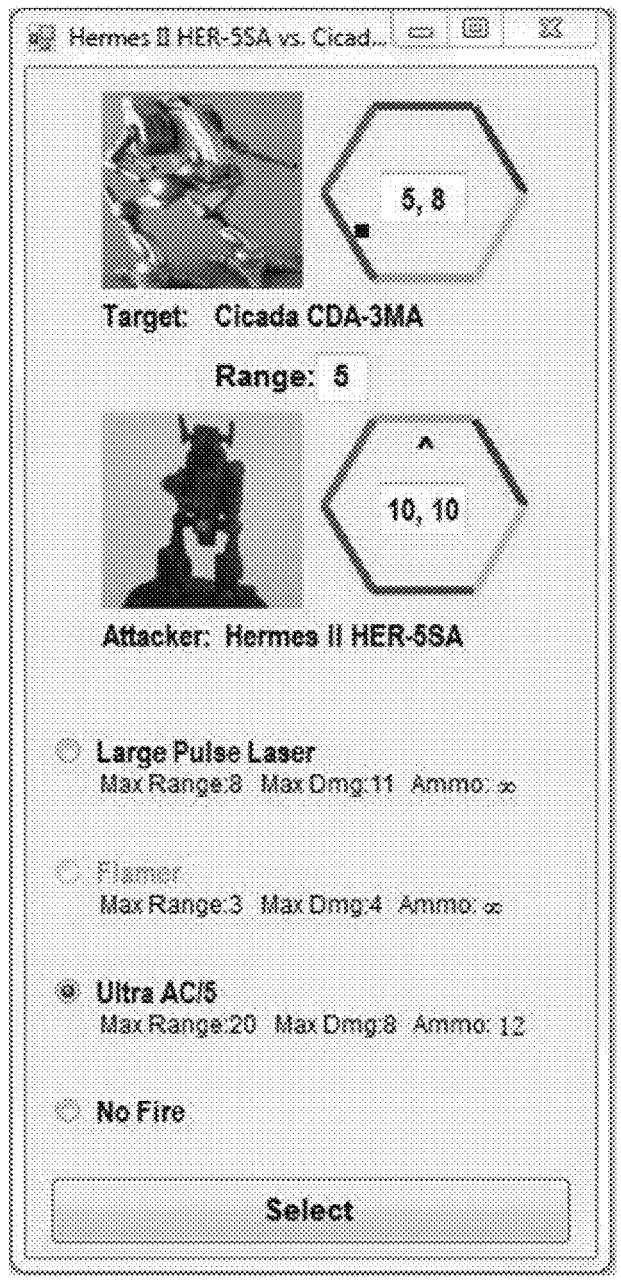

Once these positional parameters are determined, and it is determined that the attacking piece can see the target piece, the system displays an attack screen, such as the one depicted in FIG. 7b. The screen of FIG. 7b shows visual representations of the attacking piece and the target piece. The screen of FIG. 7b also shows the cell positions of the attacking piece and the target piece. The screen of FIG. 7b also shows the relative facing directions of both pieces, with the facing direction of the attacking piece being normalized toward an upward direction. That is to say, in the screen of FIG. 7b, a visual presentation corresponding to the attacker's cell is presented, but the representation of the cell is rotated such that the cell edge toward which the attacking piece is facing is toward the top screen. A caret is provided that shows the attacking piece's facing direction relative to its cell. The screen of FIG. 7b also shows the target piece, in its cell, rotated to be relative to the facing direction of the attacking piece. A caret is provided that shows the target piece's facing direction relative to its cell. For both the attacking and the target piece, their respective cells are presented with the edge indicia of cell being arranged, as they are on the physical board, in the same relative relationship to the facing position of the piece occupying the cell. In the attack depicted in FIG. 7b, the facing direction of the target piece is toward the lower-left. Thus, in the attack depicted in FIG. 7b, the attacking piece is facing the front of the target piece's left shoulder.

In the example of FIG. 7b, the attacker is provided with a menu of weapons associated with its piece that it may select for the attack, as well as a "no fire" option. The availability of weapons may be determined by the amount of ammunition, energy, fuel, or other state parameters associated with the attacking piece, the cells occupied by the attacking piece and the target piece, intervening cells, as well as the range to the target. In certain embodiments, the "attack screen" includes a display of the range between the attacking piece and the target piece. In the event that the positional parameters between the two pieces result in the targeted piece being ineligible for attack, for example, if the target piece is out of range of all of the attacking piece's weapons (or at least the ones with available ammunition or energy) the attacking player is forced to select the "no fire" option presented in the screen of FIG. 7b.

Figure 5B:
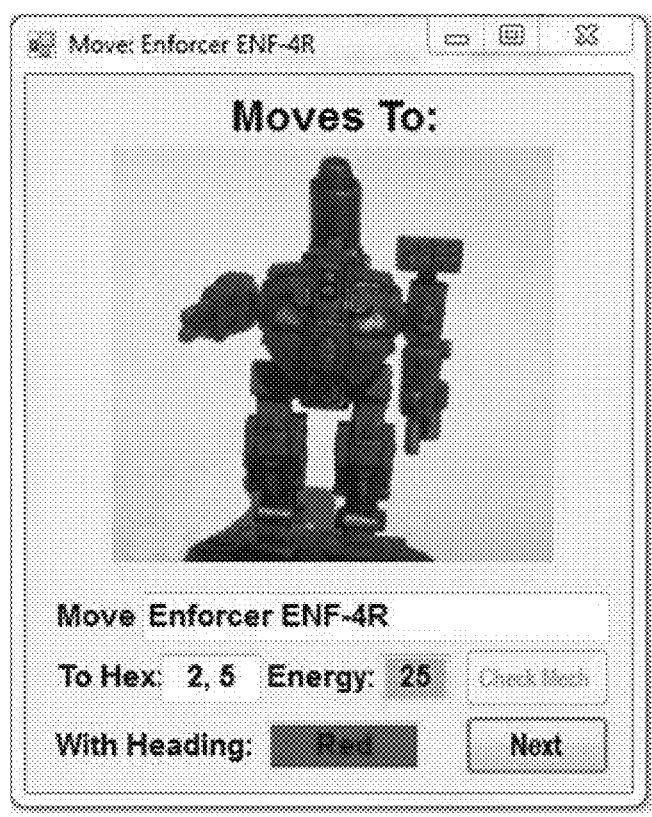
Figure 7C:
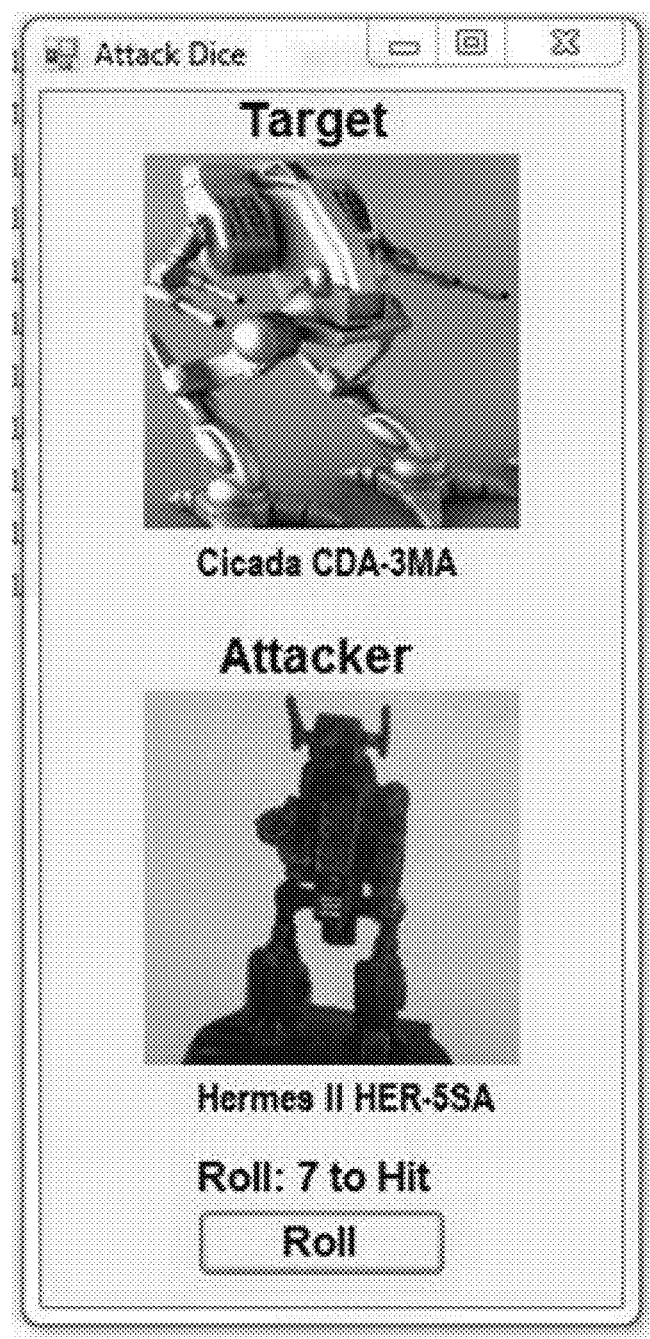
Figure 7D:
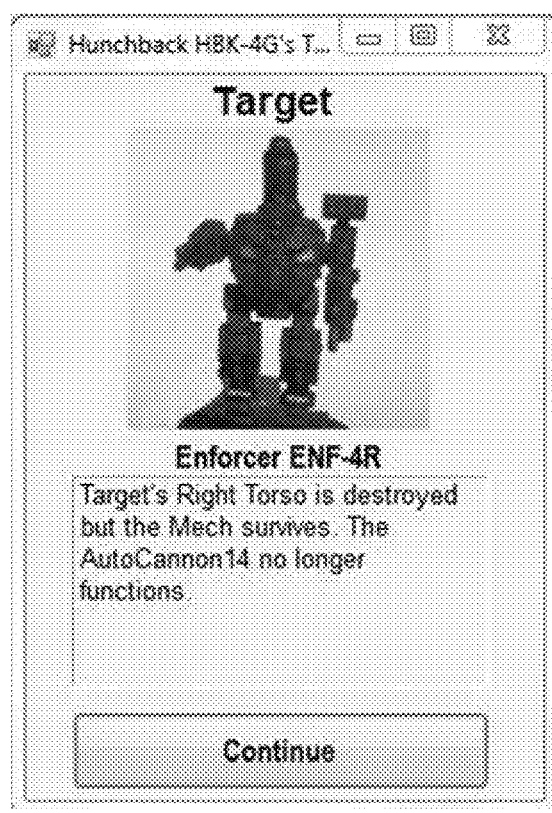

If the attacking player selects the "no fire" option, in certain optional embodiments, the attack is aborted, the player is shown a "moving piece" screen similar to that of FIG. 5B, and is prompted to take further action or end the turn. If the attacking player selects a weapon, the attack proceeds, and the system calculates a probability of a "hit" on the target as a function of the positional parameters discussed above, the type of weapon selected, and optionally, other state parameters associated with the pieces (e.g., target has a cloaking system, attacker has an upgraded targeting computer, there is fog or smoke in intervening cells, etc.). The system then displays a "dice" screen, which simulates the rolling of dice to determine whether the attacker hits the target. An exemplary dice screen is shown in FIG. 7c. The dice screen displays the roll needed to hit, and the attacking player "rolls" by pressing on the active "roll" button on the screen. Similar screens return information to the attacking player showing either a hit or a miss. If a hit is scored, the system then calculates the damage inflicted on the target piece, again, as a function of range, facing, weapon, and other piece-unique parameters, and the state of the target piece is updated in storage. If a hit is scored, in certain embodiments, the attacking player is shown a screen that includes rudimentary information about the damage incurred by the target piece (with more detailed information being available to the target player during the target player's turn). An exemplary damage display screen for the attacking player showing damage inflicted on the target is shown at FIG. 7d. If the target piece is destroyed, the system displays an indication accordingly, and provides instructions that the piece be removed from the game. If the target piece is not destroyed, the attacking player's turn ends.

While the method of FIGS. 7a-7d shows an attack between players, other forms of interaction are possible. For example, in certain embodiments, a player may direct its piece to "heal" or repair another game piece by scanning the other game piece during the player's turn.

Figure 8A:
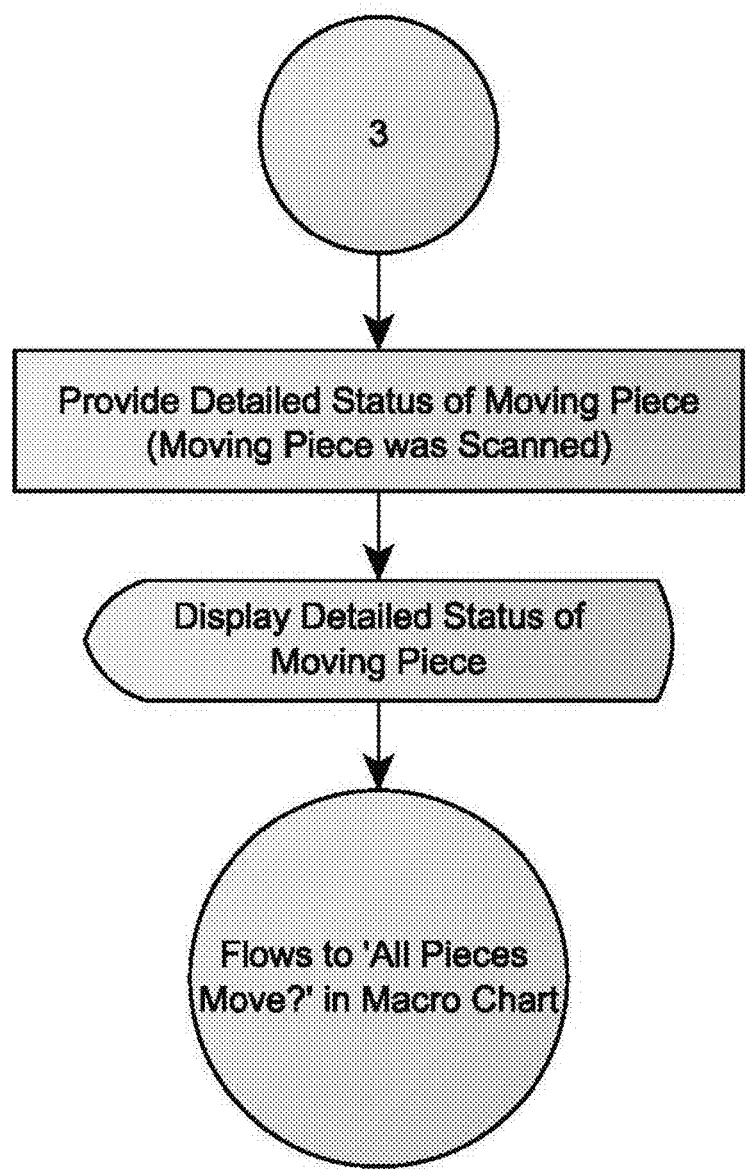
FIG. 8a is a flowchart showing a method of game play interaction with a player's own game piece according to an embodiment of the invention.
Figure 8B:
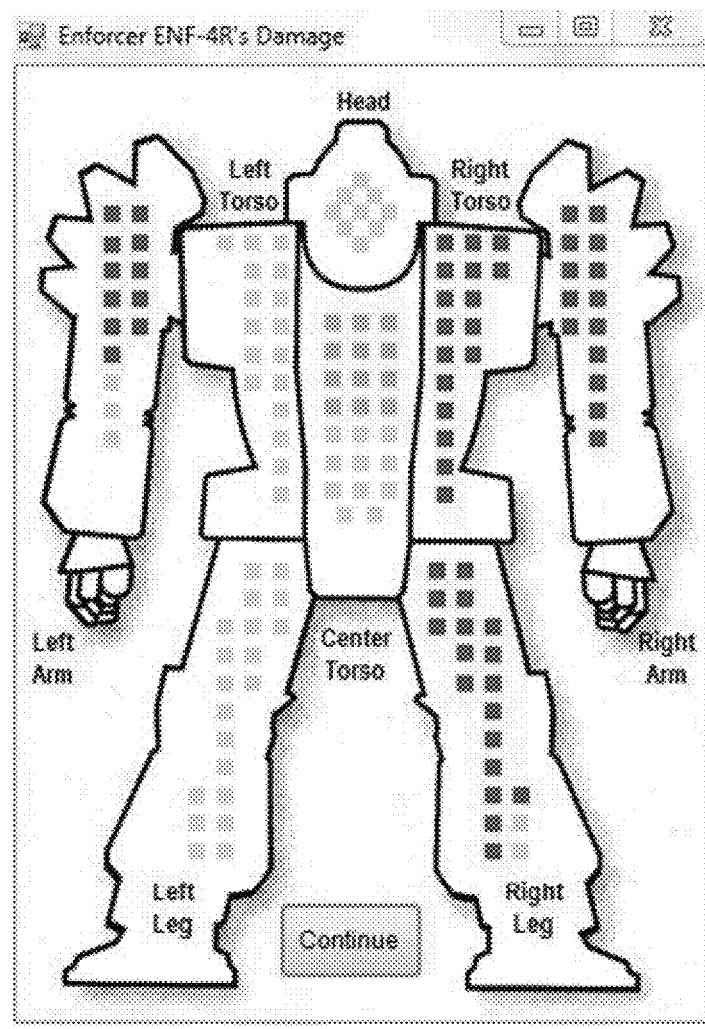

FIG. 8a is a flowchart showing a method of game play interaction with a game piece according to an embodiment of the invention. The method of FIG. 8a is implemented when a player scans the player's own piece. When this occurs, the player is presented with a screen showing detailed information regarding the player's piece, for example, detailed damage information such as is depicted in FIG. 8b.

In certain embodiments, individual steps recited in any of the above described methods are combined, eliminated, or reordered.

In certain embodiments, the invention includes an article of manufacture comprising a platform for managing or directing game play with a gaming surface having both machine readable and human readable indicia, such as computing device or smart phone 327, comprising computer readable program code residing in a non-transitory computer readable medium, such as non-volatile storage 335, where that computer readable program code can be executed by a processor, such as processor 330, to implement any of the game play methods disclosed herein.

In certain embodiments, gaming methods according to the invention are implemented in conjunction with source code residing in a computer program product, where that computer program product comprises computer readable program code that can be executed by a computing device. In either case, in certain embodiments, the computer readable program code is encoded in a non-transitory computer readable medium comprising, for example, a magnetic information storage medium, an optical information storage medium, an electronic information storage medium, and the like. "Electronic storage media," means, for example and without limitation, one or more devices, such as and without limitation, a PROM, EPROM, EEPROM, Flash PROM, compactflash, smartmedia, SD card, and the like.

Examples of computer readable program code include, but are not limited to, micro-code or micro-instructions, machine instructions, such as produced by a compiler, code used to produce a web service, and files containing higher-level instructions that are executed by a computer using an interpreter. For example, embodiments may be implemented using Java, C++, or other programming languages (e.g., object-oriented programming languages) and development tools. Additional examples of computer code include, but are not limited to, control signals, encrypted code, and compressed code.

While the preferred embodiments of the present invention have been illustrated in detail, it should be apparent that modifications and adaptations to those embodiments may occur to one skilled in the art without departing from the scope of the present invention as set forth herein.

I claim:

1. A game board, comprising:
a gaming surface;
a plurality of cells acting as playing positions,
wherein each cell includes a first unique indicia and a second unique indicia,
wherein the first unique indicia is human readable and the second unique indicia is machine readable, and wherein the first and second unique indicia constitute non-transitory markings on the gaming surface that correspond to a position of a cell,
wherein the cells are polygonal, with each cell being defined by a plurality of edges forming a perimeter around the cell, and wherein each edge of the cell includes an edge indicia, which constitutes non-transitory markings on the gaming surface,
and wherein the edge indicia includes colors, and wherein, for each cell, the edge indicia is represented by a unique color on each edge.

2. The game board of claim 1, wherein the cells are contiguous.

3. The game board of claim 1, wherein the cells are arranged in rows and columns, and wherein the first unique indicia constitutes non-transitory markings on the gaming surface indicating a row and column address of the cell.

4. The game board of claim 1, wherein the second unique indicia is a machine readable barcode.

5. The game board of claim 4, wherein the barcode is a linear or matrix barcode.

* * * * *